US010585504B2

(12) United States Patent
Park et al.

(10) Patent No.: US 10,585,504 B2
(45) Date of Patent: Mar. 10, 2020

(54) FILM TOUCH SENSOR AND METHOD FOR FABRICATING THE SAME

(71) Applicant: DONGWOO FINE-CHEM CO., LTD., Jeollabuk-do (KR)

(72) Inventors: Yong Soo Park, Gyeonggi-do (KR); Jin Gyu Cha, Gyeonggi-do (KR); Jae Hak Chun, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 15/545,475

(22) PCT Filed: Dec. 22, 2015

(86) PCT No.: PCT/KR2015/014115
§ 371 (c)(1),
(2) Date: Jul. 21, 2017

(87) PCT Pub. No.: WO2016/122116
PCT Pub. Date: Aug. 4, 2016

(65) Prior Publication Data
US 2017/0357342 A1 Dec. 14, 2017

(30) Foreign Application Priority Data

Jan. 26, 2015 (KR) .................. 10-2015-0012284

(51) Int. Cl.
*G06F 3/041* (2006.01)
(52) U.S. Cl.
CPC .... *G06F 3/041* (2013.01); *G06F 2203/04103* (2013.01)

(58) Field of Classification Search
CPC ............... G06F 3/041–047; G06F 2203/04103
(Continued)

(56) References Cited

U.S. PATENT DOCUMENTS

2012/0075207 A1* 3/2012 Jang .................. G06F 3/044
345/173
2012/0135241 A1* 5/2012 Yasuda .................... B32B 7/12
428/412

(Continued)

FOREIGN PATENT DOCUMENTS

CN 102473056 A 5/2012
CN 203502934 U 3/2014

(Continued)

OTHER PUBLICATIONS

International Search Report for PCT/KR2015/014115.

*Primary Examiner* — Stephen G Sherman
(74) *Attorney, Agent, or Firm* — The PL Law Group, PLLC

(57) ABSTRACT

A film touch sensor includes a separating layer, an electrode pattern layer including a sensing electrode disposed on the separating layer and a pad electrode disposed at one end of the sensing electrode, a circuit board connected to the pad electrode, and a base film formed on the sensing electrode and a pad area of the circuit board. The film touch sensor may be fabricated by forming a separating layer on a carrier substrate, forming an electrode pattern layer including a sensing electrode and a pad electrode on the separating layer, connecting a circuit board to the pad electrode, forming a base film on the electrode pattern layer and the circuit board, and peeling-off the separating layer from the carrier substrate.

19 Claims, 3 Drawing Sheets

(58) Field of Classification Search
USPC ......... 345/173–178; 178/18.01–18.09, 18.11
See application file for complete search history.

(56) References Cited

U.S. PATENT DOCUMENTS

| | | |
|---|---|---|
| 2012/0222805 A1 | 9/2012 | Shintani et al. |
| 2012/0242610 A1 | 9/2012 | Yasumatsu |
| 2013/0199915 A1* | 8/2013 | Guard ................. G06F 3/044 200/600 |
| 2013/0277094 A1 | 10/2013 | Lee |
| 2014/0087064 A1 | 3/2014 | Choi et al. |
| 2015/0252210 A1* | 9/2015 | Kang ................. C09D 105/16 428/217 |
| 2017/0329436 A1* | 11/2017 | Choi ................. G06F 3/041 |

FOREIGN PATENT DOCUMENTS

| | | |
|---|---|---|
| KR | 10-2012-0032735 A | 4/2012 |
| KR | 10-1191865 B1 | 10/2012 |
| KR | 10-1277546 B1 | 6/2013 |
| KR | 10-2014-0131130 A | 11/2014 |
| KR | 10-2014-0137631 A | 12/2014 |
| TW | 201243668 A | 11/2012 |
| TW | 201443742 A | 11/2014 |
| WO | WO-2014178542 A1 * | 11/2014 ............. G06F 3/044 |

\* cited by examiner

FILM TOUCH SENSOR AND METHOD FOR FABRICATING THE SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/014115, filed Dec. 22, 2015 which claims priority to the benefit of Korean Patent Application No. 10-2015-0012284 filed in the Korean Intellectual Property Office on Jan. 26, 2015, the entire contents of which are incorporated herein by reference.

BACKGROUND

1. Field

The present invention relates to a film touch sensor and a method for fabricating the same.

2. Description of the Related Art

A touch input type has been highlighted as a next-generation input type, and thus the touch input type is being applied to more various electronic devices. Accordingly, research and development for a touch sensor which may be applied to various environments and may accurately recognize a touch have been actively conducted.

For example, an ultra-thin film flexible display having improved portability while achieving ultra-lightweight and low power consumption has been required in an electronic device having a touch type display.

The flexible display refers to a display fabricated on a flexible substrate which may be curved, bent, or rolled without damaging intrinsic characteristics, may include a flexible LCD, a flexible OLED, an e-paper, or the like.

To implement the touch input type in the flexible display, excellent bending, restoring, flexible and elastic properties are required in a touch sensor.

In a film touch sensor for fabricating the flexibility display, a wiring substrate including wirings buried in a transparent resin substrate may be applied.

A method for fabricating the wiring substrate may include a wiring forming process of forming a metal wiring on a carrier substrate, a stacking process of forming a transparent resin base by applying a transparent resin solution to the metal wiring so as to cover the metal wiring and drying the same, and a process of peeling off the transparent resin base from the carrier substrate.

To facilitate the peeling-off process in the above method, an organic peeling material such as a silicon resin and a fluoro-resin, or an inorganic peeling material such as a diamond like carbon (DLC) thin film, a zirconium oxide thin film, etc., may be formed on the carrier substrate in advance.

However, in the case of using the inorganic peeling material, when peeling off the base and the metal wiring from the carrier substrate, the wiring and the base may not be easily peeled off. Accordingly, a portion of the metal wiring and the base may remain on a surface of the carrier substrate, and an organic material included in the peeling material may be transferred to the metal wiring and the base.

Thus, the metal wiring may not be completely peeled off from the carrier substrate even though the peeling material is used.

To overcome the above-described problems, Korean Registered Patent Publication No. 10-1191865 discloses a method which including: forming a sacrificial layer capable of being removed by light or a solvent, a metal wiring, and a polymer material (flexible substrate) on a carrier substrate when fabricating a flexible substrate that has a metal wiring buried therein; and then removing the sacrificial layer using the light or the solvent to peel off the metal wiring and the polymer material (flexible substrate) from the carrier substrate.

However, in the method above, the sacrificial layer may not be removed in a large-dimension process, and various film materials may not be applied in a high-temperature process.

Meanwhile, a physical peeling-off process from a carrier substrate has been conducted, however, physical damages may be caused in the touch sensor.

SUMMARY

In an aspect of the present invention, a film touch sensor including a pattern layer that may be easily formed, and a method of fabricating the same are provided.

In an aspect of the present invention, a film touch sensor capable of being easily peeled off from a carrier substrate, and a method of fabricating the same are provided.

In an aspect of the present invention, a film touch sensor capable of preventing damages during a peeling-off process from a carrier substrate, and a method of fabricating the same are provided.

The above aspects of the present inventive concepts will be achieved by the following characteristics:

(1) A film touch sensor, comprising: a separating layer; an electrode pattern layer including a sensing electrode disposed on the separating layer and a pad electrode disposed at one end of the sensing electrode; a circuit board connected to the pad electrode; and a base film formed on the sensing electrode and a pad area of the circuit board.

(2) The film touch sensor according to the above (1), wherein the separating layer is formed of at least one selected from a group consisting of polyimide-based polymer, poly vinyl alcohol-based polymer, polyamic acid-based polymer, polyamide-based polymer, polyethylene-based polymer, polystyrene-based polymer, polynorbornene-based polymer, phenylmaleimide copolymer-based polymer, polyazobenzene-based polymer, polyphenylenephthalamide-based polymer, polyester-based polymer, polymethyl methacrylate-based polymer, polyarylate-based polymer, cinnamate-based polymer, coumarin-based polymer, phthalimidine-based polymer, chalcone-based polymer, and aromatic acetylene-based polymer.

(3) The film touch sensor according to the above (1), wherein an adhesion strength between the circuit board and the base film is 1 N/25 mm or more.

(4) The film touch sensor according to the above (1), wherein the electrode pattern layer is formed of at least one selected from a group consisting of a metal oxide, a metal, a metal nanowire, a carbon-based materials, and a conductive polymer material.

(5) The film touch sensor according to the above (1), further comprising a protective layer disposed between the separating layer and the electrode pattern layer.

(6) The film touch sensor according to the above (1), further comprising an insulation layer disposed between the base film and the electrode pattern layer.

(7) The film touch sensor according to the above (6), wherein an elastic modulus difference between the protective layer and the insulation layer is 300 MPa or less at 25° C.

(8) A method of fabricating a film touch sensor, comprising: forming a separating layer on a carrier substrate; forming an electrode pattern layer including a sensing electrode and a pad electrode on the separating layer; connecting a circuit board to the pad electrode; forming a base film on the electrode pattern layer and the circuit board; and peeling-off the separating layer from the carrier substrate.

(9) The method according to the above (8), wherein the carrier substrate is a glass substrate.

(10) The method according to claim 8, wherein the separating layer is formed of at least one selected from a group consisting of polyimide-based polymer, poly vinyl alcohol-based polymer, polyamic acid-based polymer, polyamide-based polymer, polyethylene-based polymer, polystyrene-based polymer, polynorbornene-based polymer, phenylmaleimide copolymer-based polymer, polyazobenzene-based polymer, polyphenylenephthalamide-based polymer, polyester-based polymer, polymethyl methacrylate-based polymer, polyarylate-based polymer, cinnamate-based polymer, coumarin-based polymer, phthalimidine-based polymer, chalcone-based polymer, and aromatic acetylene-based polymer.

(11) The method according to claim 8, wherein the separating layer has a peel strength of 1 N/25 mm or less with respect to the carrier substrate.

(12) The method according to claim 8, further comprising forming a protective layer on the separating layer before forming the electrode pattern layer.

(13) The method according to claim 8, wherein an adhesion strength between the circuit board and the base film is 1 N/25 mm or more.

(14) The method according to claim 8, further comprising forming an insulation layer on the electrode pattern layer before forming the base film.

(15) The method according to claim 8, wherein the separating layer has a surface energy of 30 to 70 mN/m after the peeling-off from the carrier substrate.

(16) The method according to claim 8, wherein a surface energy difference between the separating layer and the carrier substrate is 10 mN/m or more.

According to the present inventive concepts, a pattern layer of a touch sensor may be formed, and then a base film may be combined to prevent a thermal damage of the base film.

According to the present inventive concepts, a carrier substrate may serve as a supporter so that the pattern layer may be easily formed.

According to the present inventive concepts, a separating layer may be also removed from the carrier substrate during a peeling-off process to protect an electrode pattern layer.

According to the present inventive concepts, damages that may occur during the peeling-off process from the carrier substrate may be prevented.

DETAILED DESCRIPTION

Example embodiments of the present invention provide a film touch sensor comprising: a separating layer; electrode pattern layers including a sensing electrode disposed on the separating layer and a pad electrode disposed at one end of the sensing electrode; a circuit board connected to the pad electrode; and a base film formed on the sensing electrode and a pad area of the circuit board. In the film touch sensor, a pattern layer may be easily formed and damages of the pad area may be prevented. A method of fabricating the film touch sensor may be also provided.

Hereinafter, example embodiments of the present invention will be described in detail.

A film touch sensor according to one embodiment of the present invention includes a separating layer, an electrode pattern layer, a circuit board, and a base film.

Figure 1:
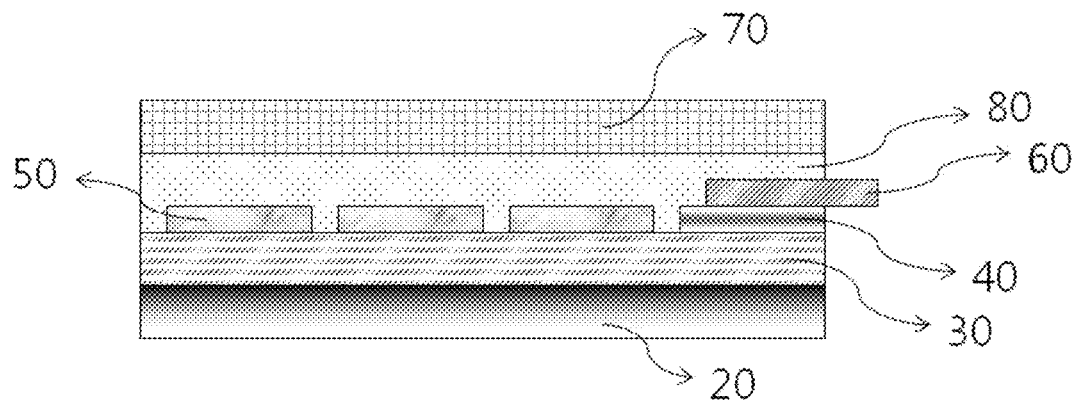
FIG. 1 is a cross-sectional view of a film touch sensor according to one embodiment of the present invention.

FIG. 1 is a cross-sectional view of a film touch sensor according to one embodiment of the present invention.

The film touch sensor may be fabricated on a carrier substrate 10, and may be obtained by separating an obtained laminate from the carrier substrate 10. An separating layer 20 may be configured to be separated from the carrier substrate 10.

The separating layer 20 may not be removed after being separated from the carrier substrate 10, and may coat the electrode pattern layer to serve as a protection layer.

The separating layer 20 may be a polymer organic layer. For example, the separating layer 20 may be formed of a polymer such as polyimide-based polymer, poly vinyl alcohol-based polymer, polyamic acid-based polymer, polyamide-based polymer, polyethylene-based polymer, polystyrene-based polymer, polynorbornene-based polymer, phenylmaleimide copolymer-based polymer, polyazobenzene-based polymer, polyphenylenephthalamide-based polymer, polyester-based polymer, polymethyl methacrylate-based polymer, polyarylate-based polymer, cinnamate-based polymer, coumarin-based polymer, phthalimidine-based polymer, chalcone-based polymer, and aromatic acetylene-based polymer, but it is not limited thereto. These may be used alone or in combination thereof.

The separating layer 20 may be formed of a material having a peeling strength of 1N/25 mm or less with respect to the carrier substrate 10 among the above-mentioned materials, so as to be easily peeled off from the carrier substrate 10 and not to be peeled off from a protective layer 30 which will be described below.

Preferably, the separating layer 20 may have a thickness of 10 to 1,000 nm, and more preferably, 50 to 500 nm. If the thickness of the separating layer 20 is less than 10 nm, an electrode pattern may be not be uniformly formed due to a poor coating uniformity during a coating process, or tearing may occur due to a local increase in peeling strength. Additionally, after a separation from the carrier substrate 10, a curl of the film touch sensor may not be controlled. If the thickness of the separating layer 20 exceeds 1,000 nm, the peeling strength may not be further decreased, and a film flexibility may be deteriorated.

Preferably, the separating layer 20 may have a surface energy of 30 to 70 mN/m after a peeling-off from the carrier substrate 10, and a surface energy difference between the separating layer 20 and the carrier substrate 10 may be 10 mN/m or more. In a fabrication process of the film touch sensor, the separating layer 20 needs to be stably adhered to the carrier substrate 10 until being peeled off from the carrier substrate 10.

When being peeled off from the carrier substrate 10, the separating layer 20 needs to be easily peeled off so that the tearing or curl of the film touch sensor may not occur. Within the range of the surface energy, the peel strength may be properly controlled, and an adhesion of the protective layer 30 or the electrode pattern layer neighboring the separation layer 20 may be enhanced to improve process efficiency. Further, when the surface energy difference between the separating layer 20 and the carrier substrate 10 is 10 mN/m or more, the separating layer 20 may be easily peeled off from the carrier substrate 10, so that tearing of the film touch sensor or cracks in each layer of the film touch sensor may be prevented.

The electrode pattern layer may be disposed on the separating layer 20.

The electrode pattern layer may include a sensing electrode 50 and a pad electrode 40 formed at one end thereof.

The sensing electrode 50 may include an electrode for detecting a touch, and also include a wiring pattern connected to the electrode.

The pad electrode 40 may be formed at one end of the sensing electrode 50, specifically in a pad area on the protective layer 30.

The pad area may refer to an area corresponding to a pad portion in the film touch sensor, and the pad area on the protective layer 30 may refer to an area corresponding to the pad portion on the protective layer 30.

The electrode pattern layer may include a conductive material without a specific limitation. For example, the electrode pattern layer may be formed of a material selected from: a metal oxide selected from a group consisting of indium tin oxide (ITO), indium zinc oxide (IZO), indium zinc tin oxide (IZTO), aluminum zinc oxide (AZO), gallium zinc oxide (GZO), fluorine tin oxide (FTO), indium tin oxide-silver-indium tin oxide (ITO-Ag-ITO), indium zinc oxide-silver-indium zinc oxide (IZO-Ag-IZO), indium zinc tin oxide-silver-indium zinc tin oxide (IZTO-Ag-IZTO), and aluminum zinc oxide-silver-aluminum zinc oxide (AZO-Ag-AZO); a metal selected from a group consisting of gold (Au), silver (Ag), copper (Cu), molybdenum (Mo), and an Ag—Pd—Cu alloy (APC); a metal nanowire selected from a group consisting of gold, silver, copper, and lead; a carbon-based material selected from a group consisting of carbon nanotube (CNT) and graphene; and a conductive polymer selected from a group consisting of poly (3,4-ethylenedioxythiophene) (PEDOT) and polyaniline (PANI). These may be used alone or in combination thereof.

The electrode pattern layer may include two or more conductive layers, e.g., may include a first electrode layer and a second electrode layer so that an electrical resistance may be reduced.

In one embodiment, the electrode pattern layers may be formed in a single layer including ITO, silver nano wire (AgNW), or metal mesh. When forming the electrode pattern layers in a multi-layered structure, the first electrode layer may be formed of a transparent metal oxide such as ITO, and the second electrode layer may be formed of a metal or AgNW on the first electrode layer to further decrease the electrical resistance.

To improve an electric conductivity of the electrode pattern layer, the film touch sensor may be formed to include at least one electrode pattern layer formed of a metal or a metal oxide. Specifically, a transparent conductive layer including the metal or the metal oxide may be formed on the separating layer or the protective layer, and then an additional transparent conductive layer may be formed thereon to prepare the electrode pattern layer. Alternatively, one or more transparent conductive layer may be laminated on the separating layer or the protective layer, and then an additional transparent conductive layer including the metal or the metal oxide may be formed thereon to prepare the electrode pattern layer. Specific examples for a laminate structure of the electrode pattern layer may be are as follows: The film touch sensor may have a structure in which a metal or metal oxide pattern layer may be further formed between the separating layer and the electrode pattern layer, a structure in which a metal or metal oxide pattern layer may be further formed between the electrode pattern layer and an insulation layer, and a structure in which a metal or metal oxide pattern layer may be further formed between the protective layer and the electrode pattern layer, and may further include one or more electrode pattern layer formed of a transparent conductive material.

Specific examples for the applicable laminate structure of the electrode pattern layer may include a structure in which a metal oxide layer may be laminated and a silver nano wire layer may be laminated thereon; a structure in which a metal oxide layer may be laminated and a metal layer may be laminated thereon; a structure in which a metal oxide layer may be laminated and a metal mesh electrode may be laminated thereon; a structure in which a silver nano wire layer may be laminated and a metal oxide layer may be laminated thereon; a structure in which a metal layer may be laminated and a metal oxide layer may be laminated thereon; a structure in which a metal mesh electrode may be laminated and a metal oxide layer may be laminated thereon; a structure in which a metal oxide layer may be laminated, a silver nano wire layer may be laminated thereon, and a metal layer may be further laminated thereon; a structure in which a silver nano wire layer may be laminated, a metal oxide layer may be laminated thereon, and a metal layer may be further laminated thereon, etc. The laminate structure of the electrode pattern layer may be modified in consideration of signal processing, electric resistance of the film touch sensor, and may not be limited to the above-described structures.

An electrical insulation layer may be formed between a first electrode pattern layer and a second electrode pattern layer, and the electrical insulation layer may be patterned to form a contact hole, so that the second electrode pattern layer may serve as a bridge electrode.

A structure of the electrode pattern layer will be described below in view of a touch sensor type.

The electrode pattern layer may preferably have a construction of a capacitance type. In this case, a mutual-capacitance or self-capacitance type may be applied.

The mutual-capacitance type may include a lattice structure in which horizontal and vertical electrodes may be formed. A bridge electrode may be formed in an intersection region of the horizontal electrode and the vertical electrode. Alternately, a horizontal electrode pattern and a vertical electrode pattern may be each formed to be electrically separated from each other.

In the self-capacitance type a capacitance change may be detected using one electrode at each point.

The film touch sensor of the present invention may further include the protective layer 30 disposed between the separating layer 20 and the electrode pattern layer.

The protective layer 30 may be disposed on the separating layer 20 and may cover the electrode pattern layer together with the separating layer 20 to prevent the electrode pattern layer from being contaminated and damaged when the separating layer 20 is separated from the carrier substrate 10.

The protective layer may include a polymer commonly known in the related art without a particular limitation thereof, and may be formed as, e.g., an organic insulation layer.

A circuit board 60 may be disposed on and electrically connected to the pad electrode 40.

The circuit board 60 may be a flexible printed circuit board (FPCB).

A base film 70 may be formed on the sensing electrode 50 and the pad area on the circuit board 60. For example, the base film 70 may be attached to the sensing electrode 50 and the circuit board by an adhesive layer 80.

The thin base film 70 commonly used in a thin-film touch sensor such as a flexible touch sensor may be easily warped or twisted, and may not be easily handled in a fabrication process. Thus, the film touch sensor may be prepared on the carrier substrate 10, and then detached from the carrier substrate 10.

Figure 2A:
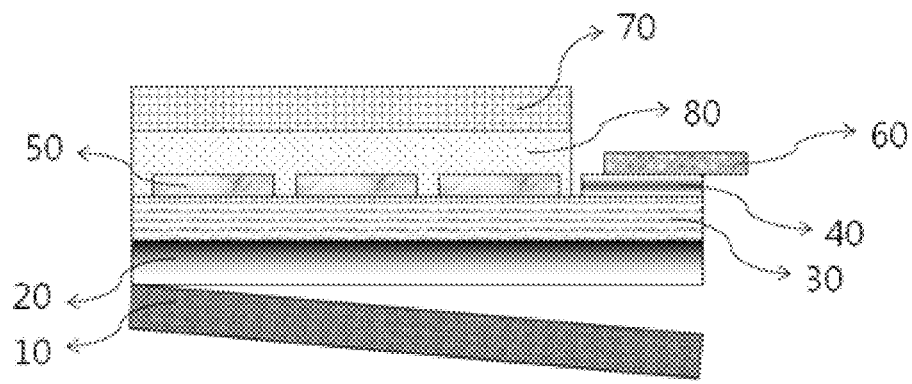
FIGS. 2A and 2B illustrate a film touch sensor according to one embodiment of the present invention, and a film touch sensor in which a base film is not attached to a circuit board.

As illustrated in FIG. 2A, the base film 70 is not generally attached on the pad area. Thus, the pad area of the touch sensor may be fractured or cracks may occur therein during a peel-off process from the carrier substrate 10.

Figure 2B:
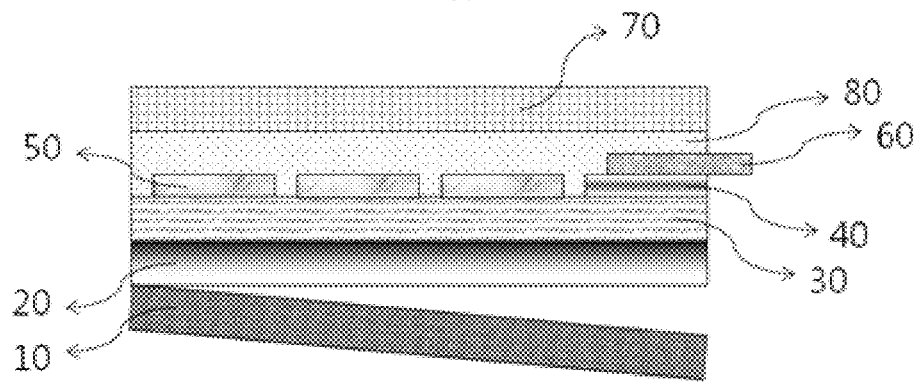

However, in the film touch sensor according to the present inventive concepts as illustrated in FIG. 2B, the base film 70 may be formed on the sensing electrode 50, and also formed on the pad area on the circuit board 60 to protect the pad area. Accordingly, the pad area may not be damaged during the peel-off process from the carrier substrate 10.

Further, when the touch sensor is applied to a display device, the circuit board may be bent upward or downward to be connected to a mother board of the display device. If the pad area is not covered with the base film and the circuit board is exposed to an outside, a connection between the circuit board and the pad electrode may be cut or failed, and circuits or patterns may be damaged due to a restoring force against the bending of the circuit board.

However, according to the film touch sensor of the present inventive concepts, the base film 70 may be also attached or formed on the pad area of the circuit board so that the above-described problems may be prevented or avoided.

The base film 7 may include a transparent film formed of a material widely used in the related art without particular limitation thereof. For example, the base film 70 may be formed of any one selected from a group consisting of cellulose ester (e.g. cellulose triacetate, cellulose propionate, cellulose butyrate, cellulose acetate propionate, and nitrocellulose), polyimide, polycarbonate, polyester (e.g. polyethylene terephthalate, polyethylene naphthalate, poly-1,4-cyclohexanedimethyleneterephthalate, polyethylene 1,2-diphenoxyethane-4,4'-dicarboxylate and polybutylene terephthalate, polystyrene (e.g. syndiotactic polystyrene), polyolefin (e.g. polypropylene, polyethylene, and polymethylpentene), polysulfone, polyether sulfone, poly arylate, polyether-imide, polymethyl methacrylate, polyether ketone, polyvinylalcohol, and polyvinylchloride, or a mixture thereof. These may be used alone or in a combination thereof.

Further, the transparent film may be an isotropic film or a retardation film.

In the case of the isotropic film, an in-plane retardation (Ro, Ro=[nx−ny]×d], nx and ny represent a main refractive index of a film plane (in-plan refractive index), nz represents a refractive index in a thickness direction of the film, and d represents a thickness of the film) may be 40 nm or less, preferably, 15 nm or less, and a retardation in a thickness direction (Rth, Rth=[(nx+ny)/2−nz]×d) may range from −90 nm to +75 nm, preferably, −80 nm to +60 nm, and more preferably, −70 nm to +45 nm.

The retardation film may be a film fabricated by a process including a mono-axial stretching of a polymer film, a biaxial stretching of a polymer film, a polymer coating or a liquid crystal coating, and may be generally employed to enhance and control optical characteristics such as a viewing angle, a color sensitivity, a light leakage, a color aesthetic in a display device.

In an implementation, a polarizing plate may be used as the base film 70.

The polarizing plate may include a polyvinyl alcohol-based polarizer and a polarizer protective film formed on at least one surface of the polarizer.

In an implementation, a protective film may be used as the base film 70.

The protective film may include a polymer resin film and an adhesive layer formed on at least one surface of the polymer resin film. The protective film may be a self-adhesion film such as a polypropylene film. The protective film may be employed to protect a surface of the film touch sensor and enhance workability.

Preferably, the base film 70 may have a light transmittance of 85% or more, and more preferably 90% or more. The base film 70 may preferably have a total Haze value of 10% or less, and more preferably 7% or less, which is measured by JIS K7136.

A thickness of the base film 70 is not specifically limited, but may be preferably 30 to 150 µm, and more preferably, 70 to 120 µm.

The base film 70 may be attached using an adhesive or a bonding agent.

As the adhesive or bonding agent, a thermally curable or photo-curable adhesive or bonding agent well known in the related art may be used without a particular limitation thereof. For example, the thermally curable or photo-curable adhesive or bonding agent may include such as polyester, polyether, urethane, epoxy, silicon, acrylic-based materials, etc.

An adhesion strength between the circuit board 60 and the base film 70 is not particularly limited, but may be preferably 1 N/25 mm or more. If the adhesion strength is less than 1 N/25 mm, the circuit board 60 and the base film 70 may not be sufficiently adhered to each other, or may be separated from each other due to an insufficient adhesion during the peel-off process or a product using. Further, the circuit board 60 may not be sufficiently protected from physical damages. In an aspect of minimizing the damages of the circuit board 60, the adhesion strength may be preferably 3 N/25 mm or more.

Figure 3:
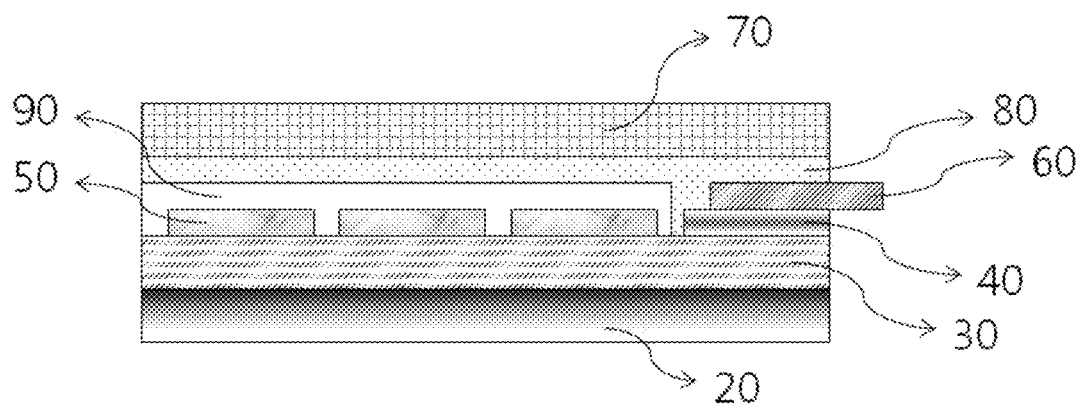
FIG. 3 is a schematic cross-sectional view of a film touch sensor according to another embodiment of the present invention.

In an implementation, as illustrated in FIG. 3, the film touch sensor of the present inventive concepts may further include an insulation layer 90 between the base film 70 and the electrode pattern layer.

The insulation layer 90 may be employed to increase an insulation effect between unit patterns of the electrode pattern layer, and further protect the electrode pattern layer.

The insulation layer 90 may be also formed to cover the pad area together with the base film 70.

An elastic modulus difference between the protective layer 30 and the insulation layer 90 may preferably be 300 MPa or less at 25° C., and more preferably 100 MPa or less, in consideration of preventing cracks due to a difference in stress releasing ability of each layer. If the elastic modulus difference between the protective layer 30 and the insulation layer 90 exceeds 300 MPa at 25° C., imbalance in a deformation energy and the stress releasing ability between the two layers may be caused to generate cracks therein.

In addition, the elastic modulus difference may be measured at 25° C. from an aspect of preventing cracks in an environment of a product user.

The insulation layer 90 may be formed of an organic insulation material satisfying the elastic modulus difference with the protective layer 30 of 300 Mpa or less. The insulation layer 90 may include a thermally curable or UV-curable organic polymer. The insulation layer 90 may be formed of at least one of an epoxy compound, an acrylic compound, a melamine compound, or the like.

The insulation layer 90 may also serve as an adhesive layer or a bonding layer. In this case, the base film 70 may be directly attached on the insulation layer 90 without using the adhesive layer 80.

The present invention also provides a method for fabricating the film touch sensor.

Hereinafter, the method for fabricating the film touch sensor according to an embodiment of the present invention will be described in detail with reference to FIGS. 4 and 5.

Figure 4:
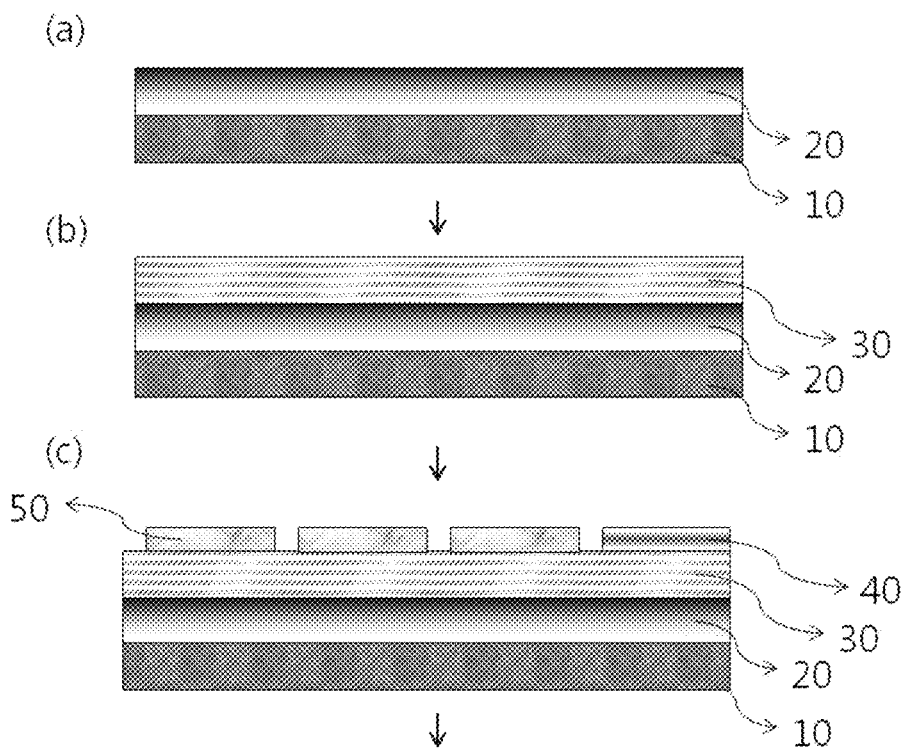
FIG. 4 is a schematic view illustrating a method of fabricating a film touch sensor according to an embodiment of the present invention.

In the method of fabricating the touch sensor according to an embodiment of the present invention, a separating layer 20 may be formed on a carrier substrate 10 as illustrated in (a) of FIG. 4, Any material having a proper strength and substantially not affected by heat or chemical processing may be used as the carrier substrate 10 so that the carrier substrate 10 may not be easily bent or distorted during the fabrication of the film touch sensor. For example, glass, quartz, a silicon wafer, SUS, or the like may be used, and preferably, the glass is used as the carrier substrate 10.

The separating layer 20 may be formed of the above-described polymer materials.

The electrode pattern layer formed of a metallic material may not be easily detached from the carrier substrate 10, however, the separating layer 20 may be relatively easily detached or peeled off from the carrier substrate 10. Thus, the separating layer 20 may be formed in advance so that a shock applied to the film touch sensor during the peel-off process from the carrier substrate 10 may be reduced, and damages in the electrode pattern layer may be also reduced.

In an aspect of minimizing a physical damage applied during the peel-off process, the separating layer 20 may preferably have a peeling strength of 1 N/25 mm or less with respect to the carrier substrate 10.

Preferably, the separating layer 20 may have a surface energy in a range from 30 to 70 mN/m after the peel-off from the carrier substrate 10, and a surface energy difference between the separating layer 20 and the carrier substrate 10 may be 10 mN/m or more. In the fabrication process of the film touch sensor, the separating layer 20 needs to be stably adhered to the carrier substrate 10 until being peeled off from the carrier substrate 10. When being peeled off from the carrier substrate 10, the separating layer 20 needs to be easily peeled off so that a tearing or curl of the film touch sensor may not occur. Within the range of the surface energy, the peel strength may be properly controlled, and an adhesion of a protective layer 30 or the electrode pattern layer neighboring the separation layer 20 may be enhanced to improve process efficiency. Further, when the surface energy difference between the separating layer 20 and the carrier substrate 10 is 10 mN/m or more, the separating layer 20 may be easily peeled off from the carrier substrate 10, so that tearing of the film touch sensor or cracks in each layer of the film touch sensor may be prevented.

Non-limiting examples of a method for forming the separation layer 20 may include slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, or the like.

After forming the separating layer 20 by the above-described method, the separating layer 20 may be subjected to an additional curing process.

The method of curing the separating layer 20 is not particularly limited. For example, a photo curing method, a thermal curing method or both may be used without a limitation of a process order of both methods.

Next, the electrode pattern layer may be formed on the separating layer 20.

As illustrated in (c) of FIG. 4, the protective layer 30 may be formed, and the electrode pattern layer may be formed on the protective layer 30. However, the method of the present inventive concepts is not limited thereto.

The electrode pattern layer may include a sensing electrode 50 and a pad electrode 40. The sensing electrode 50 may be formed on the protective layer 30, and the pad electrode 40 may be formed at one end of the sensing electrode 50.

In example embodiments, the pad electrode 40 may be formed in the pad area on the protective layer 30.

The pad electrode 40 and the sensing electrode 50 may be simultaneously formed or individually formed without a limitation of a formation order.

The electrode pattern layer may be formed using the above-described materials by substantially the same method as that for forming the protective layer 30.

In example embodiments, the protective layer 30 may be formed on the separating layer 20 before forming the electrode pattern layer, as illustrated in (b) of FIG. 4. In this case, the electrode pattern layer may be formed on the protective layer 30.

The protective layer 30 may be formed of the above-described materials, and a method of for forming the protective layer 30 is not particularly limited. For example, any method known in the related art such as physical deposition, chemical deposition, plasma deposition, plasma polymerization, thermal deposition, thermal oxidation, amphoteric oxidation, cluster-ion beam deposition, screen printing, gravure printing, flexo printing, offset printing, ink-jet coating, dispenser printing, etc., may be used.

In an implantation, the protective layer 30 may be formed by substantially the same method as that of forming the separating layer.

Figure 5:
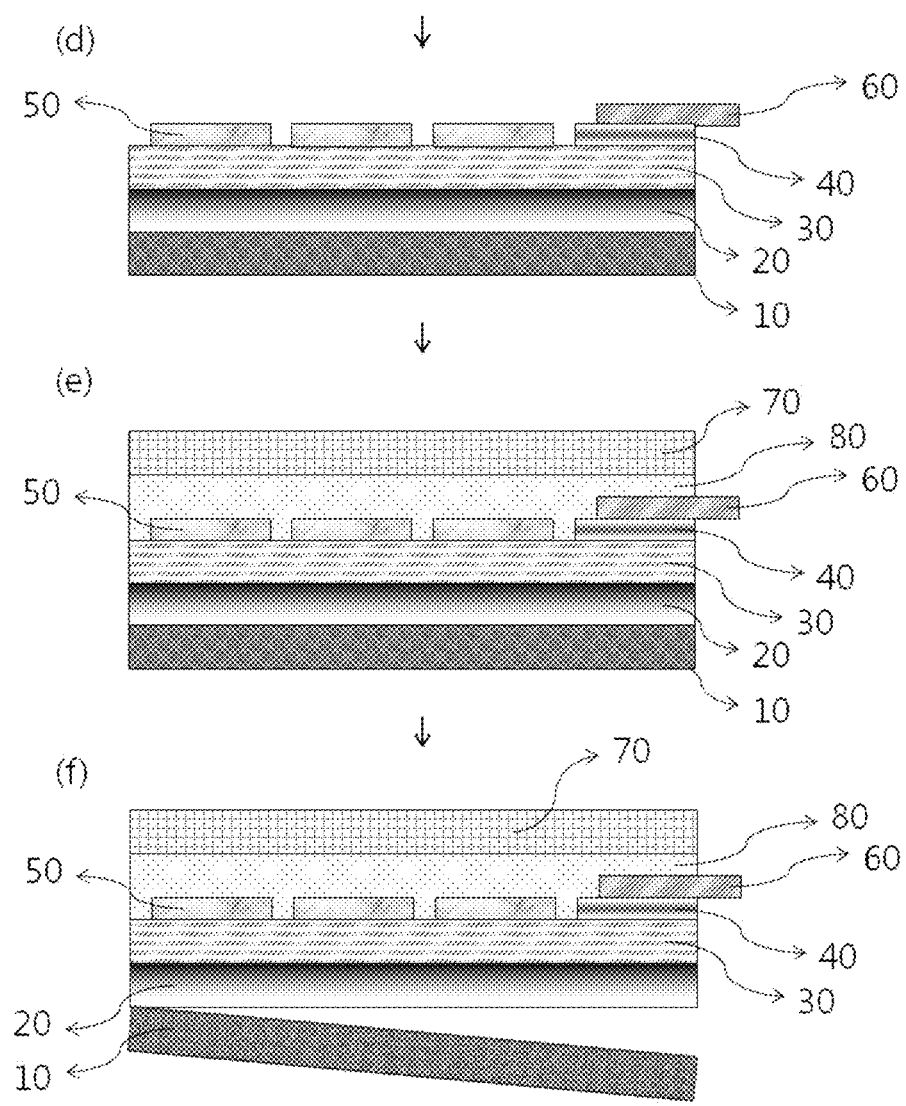
FIG. 5 is a schematic view illustrating a method of fabricating a film touch sensor according to an embodiment of the present invention

As illustrated in (d) of FIG. 5, a circuit board 60 may be connected to the pad electrode 40.

The circuit board 60 may be a flexible printed circuit board (FPCB).

Next, as illustrated in (e) of FIG. 5, a base film 70 may be formed on the sensing electrode 50 and the pad area of the circuit board 60. For example, the base film 70 may be attached to the sensing electrode 50 and the pad area of the circuit board 60 using an adhesive layer 80.

According to the present inventive concepts, the base film 70 may be formed on the sensing electrode 50, and may be also formed on the pad area of the circuit board 60 so that the base film 70 may also protect the pad area. Further, the pad area may be prevented from being damaged due to a peel-off from the carrier substrate 10 and a restoring force against bending of the circuit board 60 when the film touch sensor is applied to a display device.

The base film 70 may be a polarizing plate, a retardation film, or a protective film formed of the above-described materials.

The base film 70 may have the above-described light transmittance and Haze value.

An adhesion strength between the circuit board 60 and the base film 70 is not particularly limited. For example, the adhesion strength may preferably be 1 N/25 mm or more. If the adhesion strength is less than 1 N/25 mm, the circuit board 60 and the base film 70 may not be sufficiently adhered to each other, or may be separated from each other due to an insufficient adhesion during a peel-off process or a product using. Further, the circuit board 60 may not be sufficiently protected from physical damages. In an aspect of minimizing the damages of the circuit board 60, the adhesion strength may be preferably 3 N/25 mm or more.

In an implementation, an insulation layer 90 may be further formed on the electrode pattern layer before forming the base film 70.

The insulation layer 90 may be employed to increase an insulation effect between unit patterns of the electrode pattern layer, and further protect the electrode pattern layer.

Subsequently, as illustrated in (0 of FIG. 5, the separating layer 20 may be peeled off from the carrier substrate 10.

After the peel-off, the separating layer 20 may remain in the film touch sensor without being removed therefrom, and serve as a coating layer for protecting the electrode pattern layer.

It will be obvious to those skilled in the related art that the preferred embodiments described above are only examples of the present inventive concepts and therefore do not limit the accompanying claims, and various modifications and alterations can be made without departing from the scope and spirit of the present invention. In addition, these modifications and alterations will fall within the following claims.

What is claimed is:

1. A film touch sensor, comprising:
   a separating layer;
   a protective layer formed on an upper surface of the separating layer, the protective layer entirely covering the upper surface of the separating layer;
   an electrode pattern layer including a sensing electrode and a pad electrode disposed on the separating layer;
   a circuit board connected to the pad electrode, the circuit board having a pad area which is connected to the pad electrode, the pad area being a portion of the circuit board that overlaps the pad electrode in a thickness direction; and
   a base film formed on the sensing electrode and the pad area of the circuit board, the base film entirely covering the pad area of the circuit board; and
   wherein the sensing electrode, the pad electrode and the pad area of the circuit board are located between the separating layer and the base film.

2. The film touch sensor according to claim 1, wherein the separating layer is formed of at least one selected from a group consisting of polyimide-based polymer, poly vinyl alcohol-based polymer, polyamic acid-based polymer, polyamide-based polymer, polyethylene-based polymer, polystyrene-based polymer, polynorbornene-based polymer, phenylmaleimide copolymer-based polymer, polyazobenzene-based polymer, polyphenylenephthalamide-based polymer, polyester-based polymer, polymethyl methacrylate-based polymer, polyarylate-based polymer, cinnamate-based polymer, coumarin-based polymer, phthalimidine-based polymer, chalcone-based polymer, and aromatic acetylene-based polymer.

3. The film touch sensor according to claim 1, wherein an adhesion strength between the circuit board and the base film is 1 N/25 mm or more.

4. The film touch sensor according to claim 1, further comprising an insulation layer disposed between the base film and the electrode pattern layer.

5. The film touch sensor according to claim 4, wherein an elastic modulus difference between the protective layer and the insulation layer is 300 MPa or less at 25° C.

6. The film touch sensor according to claim 1, wherein the separating layer has a thickness of 10 to 1,000 nm.

7. The film touch sensor according to claim 1, wherein the separating layer is formed of a material having a peeling strength of 1N/25 mm or less with respect to a material selected from the group consisting of glass, quartz, a silicon wafer, and stainless steel.

8. The film touch sensor of claim 1, wherein the circuit board has the pad area formed on a part of the pad electrode and another area which is not formed on the pad electrode; and
   the base film is formed on the sensing electrode, the pad electrode, and the first part of the circuit board.

9. The film touch sensor of claim 1, further comprising an adhesive layer between the base film and the protective layer.

10. The film touch sensor of claim 9, further comprising an insulation layer disposed between the adhesive layer and the electrode pattern layer.

11. A method of fabricating a film touch sensor, comprising:
    forming a separating layer on a carrier substrate;
    forming an electrode pattern layer including a sensing electrode and a pad electrode on the separating layer;
    connecting a pad area of a circuit board to the pad electrode, the pad area being a portion of the circuit board that overlaps the pad electrode in a thickness direction;
    forming a base film on the electrode pattern layer and the circuit board to entirely cover the electrode pattern layer and the pad area of the circuit board; and
    separating the carrier substrate from the separating layer, wherein the sensing electrode, the pad electrode and the pad area of the circuit board are located between the separating layer and the base film.

12. The method according to claim 11, wherein the carrier substrate is a glass substrate.

13. The method according to claim 11, wherein the separating layer is formed of at least one selected from a group consisting of polyimide-based polymer, poly vinyl alcohol-based polymer, polyamic acid-based polymer, polyamide-based polymer, polyethylene-based polymer, polystyrene-based polymer, polynorbornene-based polymer, phenylmaleimide copolymer-based polymer, polyazobenzene-based polymer, polyphenylenephthalamide-based polymer, polyester-based polymer, polymethyl methacrylate-based polymer, polyarylate-based polymer, cinnamate-based polymer, coumarin-based polymer, phthalimidine-based polymer, chalcone-based polymer, and aromatic acetylene-based polymer.

14. The method according to claim 11, wherein the separating layer has a peel strength of 1 N/25 mm or less with respect to the carrier substrate.

15. The method according to claim 11, further comprising forming a protective layer on the separating layer before forming the electrode pattern layer.

16. The method according to claim 11, wherein an adhesion strength between the circuit board and the base film is 1 N/25 mm or more.

17. The method according to claim 11, further comprising forming an insulation layer on the electrode pattern layer before forming the base film.

18. The method according to claim 11, wherein the separating layer has a surface energy of 30 to 70 mN/m after the peeling-off from the carrier substrate.

19. The method according to claim 11, wherein a surface energy difference between the separating layer and the carrier substrate is 10 mN/m or more.

* * * * *